Sept. 6, 1966 P. B. MASON ETAL 3,270,652
PHOTOGRAPHIC APPARATUS SUPPORT
Original Filed Nov. 24, 1961 3 Sheets-Sheet 1
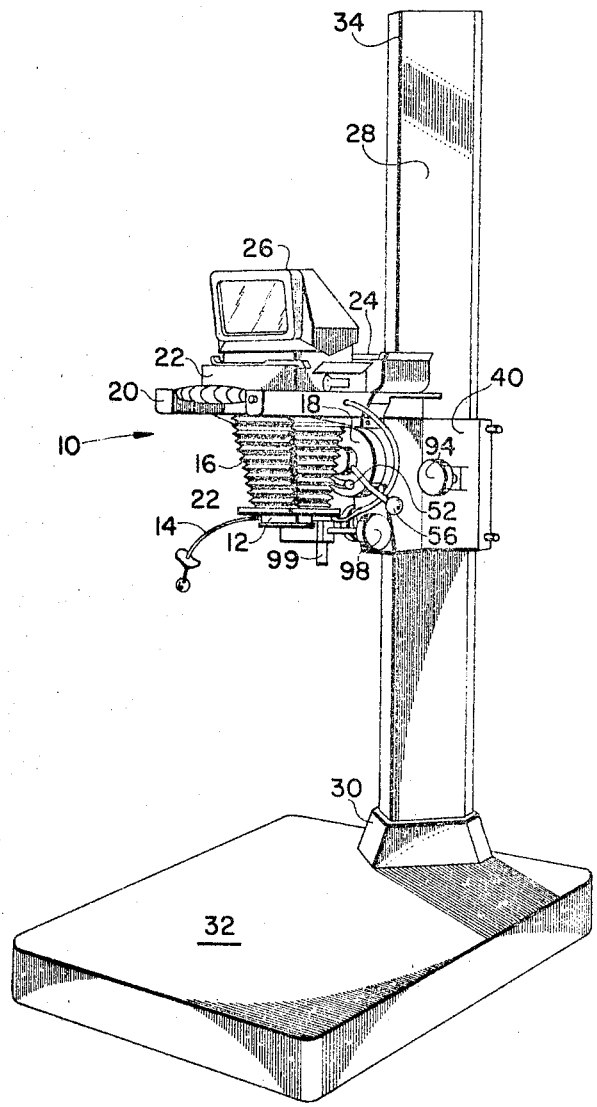
FIG. I
INVENTORS
Paul B. Mason
Leon Rubinstein
and
Arthur J. Sable
BY Brown and Mikulka
and
Charles J. McGuire
ATTORNEY

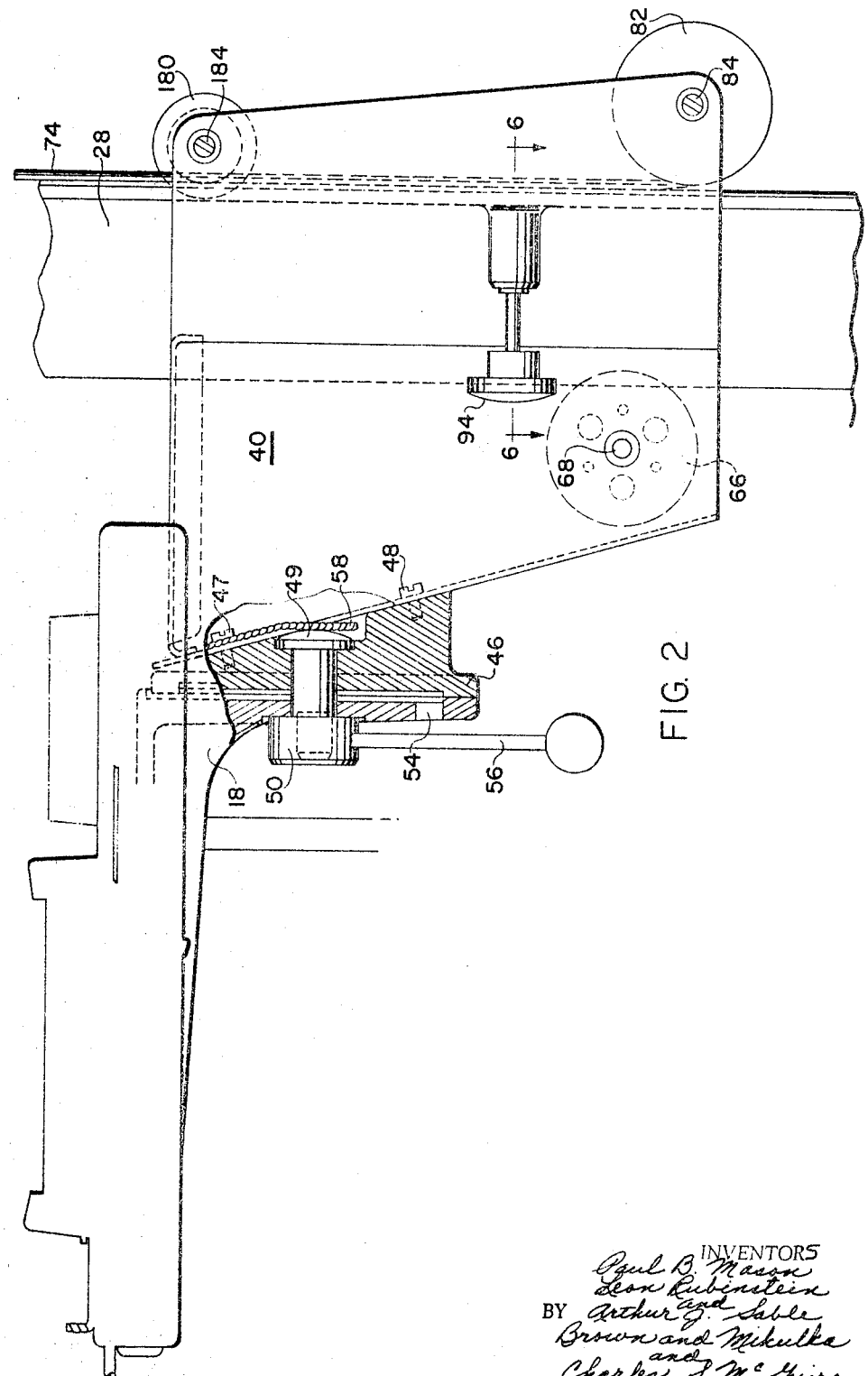

United States Patent Office 3,270,652
Patented Sept. 6, 1966

3,270,652
PHOTOGRAPHIC APPARATUS SUPPORT
Paul B. Mason, Magnolia, and Leon Rubinstein, Natick, Mass., and Arthur J. Sable, Saratoga, Calif., assignors to Polaroid Corporation, Cambridge, Mass., a corporation of Delaware
Original application Nov. 24, 1961, Ser. No. 154,655, now Patent No. 3,143,941, dated Aug. 11, 1964. Divided and this application June 3, 1964, Ser. No. 372,222
3 Claims. (Cl. 95—86)

This application is a division of copending U.S. application Serial No. 154,655, filed November 24, 1961, now Patent No. 3,143,941.

The present invention relates to photographic apparatus, and more specifically to novel structures for adjustably supporting photographic apparatus in a desired position.

In many applications of certain types of photographic apparatus it is necessary or desirable to provide a support structure which allows positioning and holding of the apparatus in some predetermined position. For example, overhead enlargers and copy cameras are often positioned vertically above the object which is to be photographed or exposed. It is therefore necessary to provide means for supporting the apparatus in such a vertical position and may also be advantageous to permit selective, adjustable positioning of the apparatus upon its support. Of course, it is desirable that the support be stable and relatively vibration-free so that there will be no relative movement of the photographic apparatus and the object being photographed, printing paper, or the like, during exposure.

Accordingly, it is a principal object of the present invention to provide a support structure for holding photographic apparatus in a desired position, which structure permits selective, adjustable positioning of the said apparatus and provides an extremely stable support while being simple and economical in construction.

A further object is to provide a novel support column for adjustably holding photographic apparatus in a desired vertical position and having an interattachment between the column and apparatus which provides ease of handling as well as an economical and stable support.

Still another object is to provide novel and improved photographic apparatus support means which are simple and economical in manufacture, rugged and durable in use and refined in appearance.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a perspective view of an embodiment of the support structure of the present invention with photographic apparatus mounted thereon;

FIG. 2 is a fragmentary, side elevational view of the apparatus of FIGURE 1;

Figure 4:
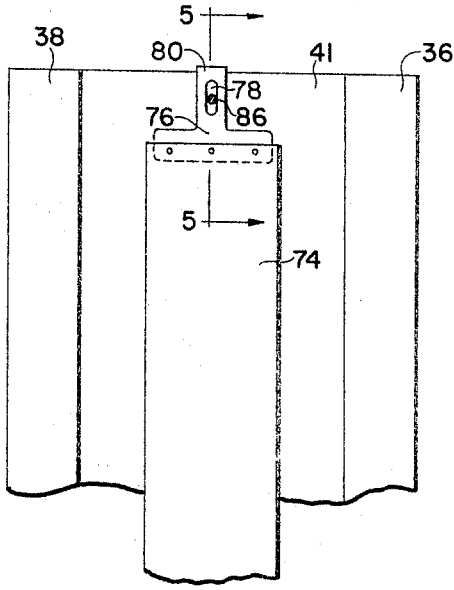
FIG. 4 is a fragmentary, rear elevational view.

In FIGURE 1 the support apparatus of the invention is shown with photographic apparatus in the form of an industrial copy camera of the self-developing type mounted thereon. The apparatus of FIGURE 1, including both the support structure and the camera, is a commercial embodiment sold by the Polaroid Corporation, Cambridge, Massachusetts, and designated the MP-3 Industrial View Land Camera. It will be readily understood, however, that modifications of the support structure within the scope of the invention are contemplated, and that the specific form of the photographic apparatus mounted thereon is not pertinent to the invention.

For convenience of illustration the camera structure, designated generally by the reference numeral 10, is shown somewhat diagrammatically. Camera 10 includes lens and shutter housing 12, shutter release cable 14, and bellows 16 attached at one end to housing 12 and at the other end to a first base portion 18, seen more clearly in FIG. 3, having an opening therein over which bellows 16 is mounted. A second base portion or carrier 20 includes first means 22 for mounting a focusing panel and/or cut film holder and second means 24, such as a camera back, for mounting a roll-type film. Appropriate openings are provided in carrier 20 and may be selectively aligned with the previously mentioned opening in base portion 18, whereby either the focusing panel and cut film holder or the roll film holder may be placed in registration with the shutter and optical system of camera 10. The shutter may be opened to allow framing and focusing of an object to be photographed on a ground glass focusing panel through the camera lens system. Focusing hood 26 may be mounted in covering relation to the focusing panel to assist in viewing. The structure and preferred operation of the camera elements described above is explained in much greater detail in the aforementioned U.S. application Serial No. 154,655.

Figure 3:
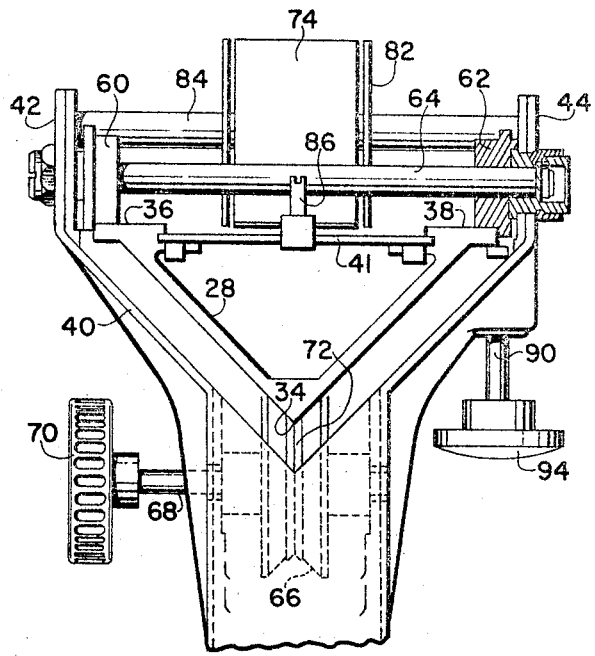
FIG. 3 is a fragmentary, top plan view, partly in section.
Figure 5:
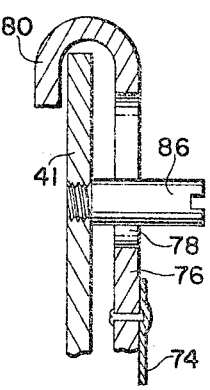
FIG. 5 is a fragmentary, side view in section on the line 5—5 of FIG. 4.

Support column 28 extends vertically from an anchored position provided, for example, by collar 30 on base board 32. As seen in FIG. 3, column 28 is generally V-shaped in horizontal cross section, having a forwardly disposed, vertical edge 34 at the vertex of the V, and two rearwardly disposed edges, which may be bent over or widened to form surfaces 36 and 38. The terms front, forward, forwardly, etc., as used herein denote that portion of the support structure facing or nearest the photographic apparatus, the terms rear, rearwardly, etc., having the opposite meaning. Rear plate 41 may be affixed to column 28 across the open side thereof, between rear surfaces 36 and 38, to afford added rigidity.

Mounting bracket 40 extends around the forward side of support column 28, as best seen in FIG. 3, and terminates in parallel flange sections 42 and 44. Casting 46 is attached by screws 47 and 48 to mounting bracket 40. Base portion 18 is held in engagement with casting 46 by screw 49 and nut 50. Fixed stud 52 (FIG. 1) on casting 46 projects through slot 54 in base portion 18. If nut 50 is loosened, base 18 and the parts mounted thereon may be turned relative to the mounting assembly screw 49 acting as a pivotal mounting and stud 52 riding in slot 54 serving to limit the movement. Slot 54 extends arcuately for 90° around the opening in casting 46 through which screw 49 projects. Thus, when base 18 is positioned with one end of slot 54 against stud 52, the camera mechanism is vertically positioned, as in FIG. 1, for photographing objects directly below; when the apparatus is rotated so that the other end of slot 54 is against stud 52 the camera is positioned horizontally, exactly at 90° to its former position. Handle 56 provides the necessary leverage for loosening and tightening nut 50 and spring 58 serves to urge screw 49 forwardly to a stable position with respect to casting 46.

Wheels 60 and 62 are mounted to turn on shaft 64, which passes through each of flange sections 42 and 44. Adjusting wheel 66 is mounted on shaft 68 which may be manually turned by means of adjusting knob 70. As best seen in FIG. 2, wheels 60 and 62 are mounted near the top of mounting bracket 40 while adjusting wheel 66 is mounted near the bottom on the opposite side of column 28. Thus, the weight of base portion 18 and the apparatus mounted thereon create a turning moment on mounting bracket 40, tending to turn it counterclockwise as viewed in FIG. 2, and load adjusting wheel 66 against column 28. At least a portion, indicated at 72 in FIG. 3, of adjusting wheel 66 is preferably made of a material having a high coefficient of friction with respect to column 28, such as rubber, thus making the frictional engagement between the two more secure and allowing fine vertical adjustment of the apparatus by turning knob 70.

In order to help support the weight of the apparatus and facilitate vertical positioning, constant force spring 74 is provided. Spring 74, preferably formed of a flexible strip of metal, is attached at one end to member 76 which includes slot 78 and terminates in hook 80. The other end of spring 74 is attached to drum 82 which rotates on shaft 84, mounted near the bottom of mounting bracket 40, the spring being biased to coil around the drum. Hook 80 is engaged over the top of plate 41, thereby fixing the position of the upper end of spring 74. Screw 86 passes through slot 78 and is secured in plate 41. The diameter of screw 86 is approximately equal to the width of slot 78, thus preventing horizontal movement of member 76 and spring 74. The distance between the bottom of screw 86 and the bottom of slot 78 is less than the length of the end portion of hook 80 which passes over plate 41. Consequently, hook 80 cannot be disengaged from plate 41 unless screw 86 has been removed. The length of screw 86 when fully engaged is such that it projects outwardly from plate 41 far enough to be contacted by shaft 64 when the apparatus is raised. Screw 86 thus performs the triple function of securing member 76 to plate 41, preventing horizontal movement of member 76 and spring 74, and acting as a vertical stop. Thus, as the apparatus is raised and lowered on column 78, spring 74 winds and unwinds from drum 82, exerting an upward force on the apparatus.

Figure 6:
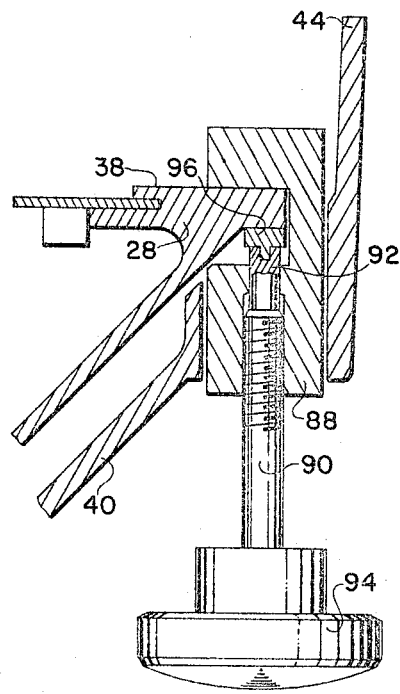
FIG. 6 is a fragmentary, top view in section on the line 6—6 of FIG. 2.

A clamp assembly, comprising cylindrical block 88, which fits through an opening in mounting bracket 40, screw 90 and pin 92, provides means for fixing the vertical position of the apparatus on column 28. As knob 94 is turned, screw 90 is advanced through the threaded hole in block 88, forcing nylon pad 96, which is affixed to the end of pin 92, against column 28. A portion of column 28 is thereby engaged between pad 96 and the cut-out portion of block 88, as seen in FIG. 6, and the position of mounting bracket 40 and the apparatus mounted thereon is fixed with respect to column 28. Since block 88 is not fixedly attached to mounting bracket 40, the tightening of the clamp assembly does not exert a twisting force on the mounting bracket or any of the rest of the apparatus.

To change and adjust the vertical position of the photographic apparatus mounted on column 28 the operator loosens the clamping assembly by turning knob 94. The apparatus is then raised or lowered to the approximate desired position, spring 74 helping to support the weight of the apparatus. Fine adjustment is made by turning knob 70 to bring the apparatus to the exact desired vertical position. The position is then fixed by turning knob 94 to tighten the clamping assembly. A turning moment is exerted on mounting bracket 40 by the apparatus extending therefrom away from column 28. Therefore, the photographic apparatus acts as its own counterweight, loading adjusting wheel 66 against column 28, and providing positive three-point suspension where column 28 is contacted by wheels 60, 62 and 66. The shape of column 28 provides a rigid structure, suitable for mounting apparatus thereon in the above-described manner, which may be economically fabricated, as for example by extrusion of a metal such as aluminum.

The vertical position of the photographic apparatus is normally adjusted to achieve the desired "framing"; that is, to insure that the area to be photographed fits the format of the film (in the case of the illustrated copy camera), to insure that a desired area of printing paper is covered by the projected negative image (as in the case of an overhead enlarger), etc. After the apparatus is locked in the vertical position which provides the proper framing, the optical system may be moved relative to the exposure plane to focus properly the image projected onto the photographing medium. In the case of camera 10, for example, focusing may be accomplished by turning knob 98 which is mounted on a rotatable shaft affixed with respect to the optical system. The shaft includes a pinion (not shown) which is rotated with respect to rack 99, extending rigidly from base portion 18.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A support structure for adjustably holding photographic apparatus in a selected vertical position, said structure comprising, in combination:
   (a) a unitary, one-piece support column extending vertically from an anchored position at its lower end and having a substantially V-shaped horizontal cross section, whereby said column has a forwardly disposed vertical edge at the vertex of the V, and two rearwardly disposed vertical edges;
   (b) a mounting bracket including a plate-like section positioned adjacent a portion of the forwardly disposed surfaces of said column, whereby said bracket has a rearwardly disposed surface facing said column and a forwardly disposed surface facing away from said column, and having a pair of flanges extending rearwardly past said rearwardly disposed edges;
   (c) first and second wheels mounted one upon each of said flanges for rotation about first horizontal axes;
   (d) a third wheel mounted upon a forwardly disposed portion of said mounting bracket for rotation about a second horizontal axis;
   (e) said second axis being parallel to and lower than said first axes;
   (f) said first, second and third wheels being in rolling engagement with each of said rearwardly disposed edges and said forwardly disposed edge, respectively, during vertical movement of said mounting bracket with respect to said column; and
   (g) means for rigidly securing said photographic apparatus to said forwardly disposed surface of said mounting bracket, to extend horizontally therefrom above said second axis, whereby the weight of said apparatus exerts a turning moment on said mounting bracket urging said first and second wheels against said rearwardly disposed edges and said third wheel against said forwardly disposed edge.

2. The invention according to claim 1 wherein a spring is fixedly attached at one end above said mounting bracket and attached at the other end to a drum mounted upon said mounting bracket for rotation about a third horizontal axis, said spring being biased toward coiling movement about said drum, whereby said spring exerts a lifting force on said mounting bracket.

3. The invention according to claim 2 and further including a clamping assembly including a block having a channel formed therein for receiving a portion of said column, and a manually adjustable screw extending through a threaded portion of said block to frictionally engage said portion of said column between the end of said screw and the portion of said block on the opposite side of said column, said assembly extending through an opening in said mounting bracket, whereby the vertical position of said bracket may be fixed relative to said column by resting upon said clamping assembly when the latter is frictionally engaged with said column without exerting a distorting force on either said bracket or said column.

References Cited by the Examiner
UNITED STATES PATENTS

| | | | |
|---|---|---|---|
| 2,469,009 | 5/1949 | Simmon | 88—24 |
| 2,469,685 | 5/1949 | Eagle | 88—24 |

JOHN M. HORAN, *Primary Examiner.*